(12) United States Patent
Chen et al.

(10) Patent No.: US 9,031,807 B2
(45) Date of Patent: May 12, 2015

(54) MOTHERBOARD TESTING APPARATUS

(75) Inventors: Xiang-Biao Chen, Shenzhen (CN); Hong-Lang Lu, Shenzhen (CN); Yu-Lin Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 869 days.

(21) Appl. No.: 13/195,006

(22) Filed: Aug. 1, 2011

(65) Prior Publication Data
US 2012/0221282 A1 Aug. 30, 2012

(30) Foreign Application Priority Data

Feb. 24, 2011 (CN) .......................... 2011 1 0044754

(51) Int. Cl.
*G01R 27/28* (2006.01)
*G06F 11/22* (2006.01)
(52) U.S. Cl.
CPC .................................. *G06F 11/2284* (2013.01)

(58) Field of Classification Search
None
See application file for complete search history.

(56) References Cited

U.S. PATENT DOCUMENTS 7,710,100 B2 * 5/2010 Xiong .......................... 324/73.1

* cited by examiner

*Primary Examiner* — Aditya Bhat
(74) *Attorney, Agent, or Firm* — Novak Druce Connolly Bove + Quigg LLP

(57) ABSTRACT

A motherboard testing apparatus for testing a motherboard by subjecting it to sequential power-on and power-off modes includes a control module, a switch module and a display module. The control module stores power-on and power-off number of times and outputs control signals accordingly. The switch module provides a first voltage to the motherboard according to the control signals. The switch module includes a photocoupler and a delay. The photocoupler includes an LED and a phototransistor. The delay includes a winding element and a switch element. The display module displays the time periods and the number of times the motherboard abnormally power-on and power-off. The LED receives the control signals. The phototransistor turns on when the LED emits light. The winding element is powered up and closes the switch element. The switch element outputs the first voltage.

14 Claims, 5 Drawing Sheets

MOTHERBOARD TESTING APPARATUS

CROSS-REFERENCE TO RELATED APPLICATIONS

This application claims priority to Chinese Patent Application No. 201110044754.3 filed on Feb. 24, 2011, the contents of which are incorporated by reference herein.

BACKGROUND

1. Technical Field

The present disclosure relates to motherboard testing apparatuses, and especially relates to a motherboard testing apparatus for automatically turning on and off a motherboard.

2. Description of Related Art

In computer systems such as personal computer (PC) systems, operators usually need to press a power button of the PC system to ground a sixth terminal of a computer front panel header, thereby turning on the computer system, which is inconvenient and time consuming for operators who are manually performing a motherboard test, in which it is commonly necessary to power up the motherboard about a thousand times.

Therefore there is a need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
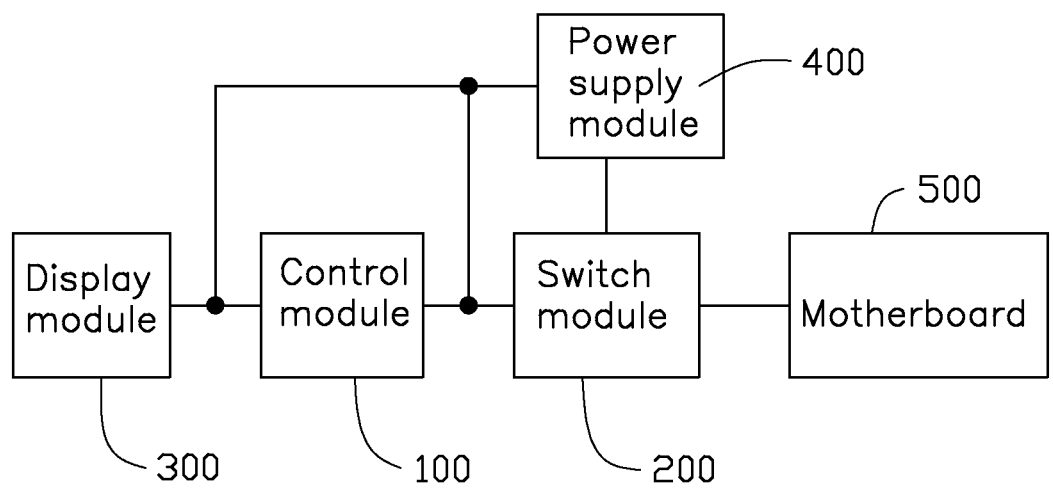
FIG. 1 is a block view of a motherboard testing apparatus in accordance with an embodiment.

Referring to FIG. 1, a motherboard testing apparatus for testing the power-on and power-off cycle of a motherboard 500, includes a control module 100, a switch module 200, a display module 300 and a power supply module 400.

The control module 100 stores predetermined power-on and power-off number of times and outputs control signals accordingly. The switch module 200 provides a first voltage to the motherboard 500 according to the control signals. The control module 100 records time periods and present number of times for which the motherboard 500 is powered on and powered off. The control module 100 displays the time periods and the number of times the motherboard 500 abnormally power-on and power-off on the display module 300. The power supply module 400 provides power supplies to the control module 100, the switch module 200 and the display module 300.

Figure 2:
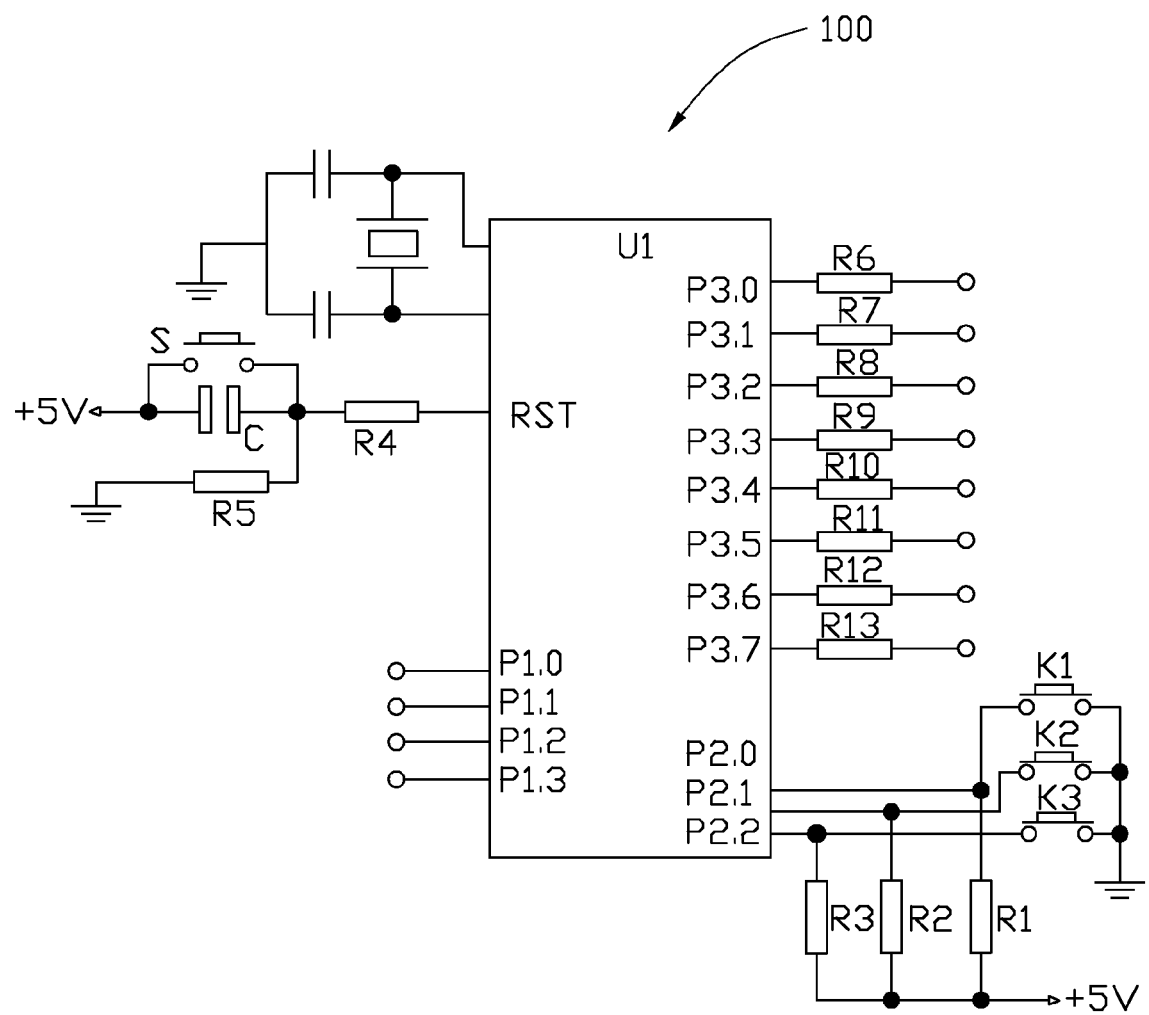
FIG. 2 is a circuit view of a control module of FIG. 1.

Referring to FIG. 2, the control module 100 includes a microcontroller U1 and pressing buttons K1~K3. The microcontroller U1 includes an enable output terminal P1.0, a read and write output terminal P1.1, a select output terminal P1.2, a control signal output terminal P1.3, a reset signal input terminal RST, test signal input terminals P2.0~P2.2 and data output terminals P3.0~P3.7. The control signal output terminal P1.3 outputs the control signals. The test signal input terminals P2.0~P2.2 are grounded via the pressing buttons K1~K3. The test signal input terminals P2.0~P2.2 receive a third voltage via resistors R1~R3. The data output terminals P3.0~P3.7 output the time periods and the number of times the motherboard 500 abnormally power-on and power-off. The reset signal input terminal RST receives the third voltage via a resistor R4 and a capacitor C connected in series. The reset signal input terminal RST is grounded via resistors R4 and R5 connected in series. A reset switch S is connected in parallel with the capacitor C. The reset signal input terminal RST receives a reset signal to initialize the microcontroller U1 when the reset switch S is pressed. In one embodiment, the microcontroller U1 is a AT89S52 type single chip produced by the ATMEL semiconductor company.

Figure 3:
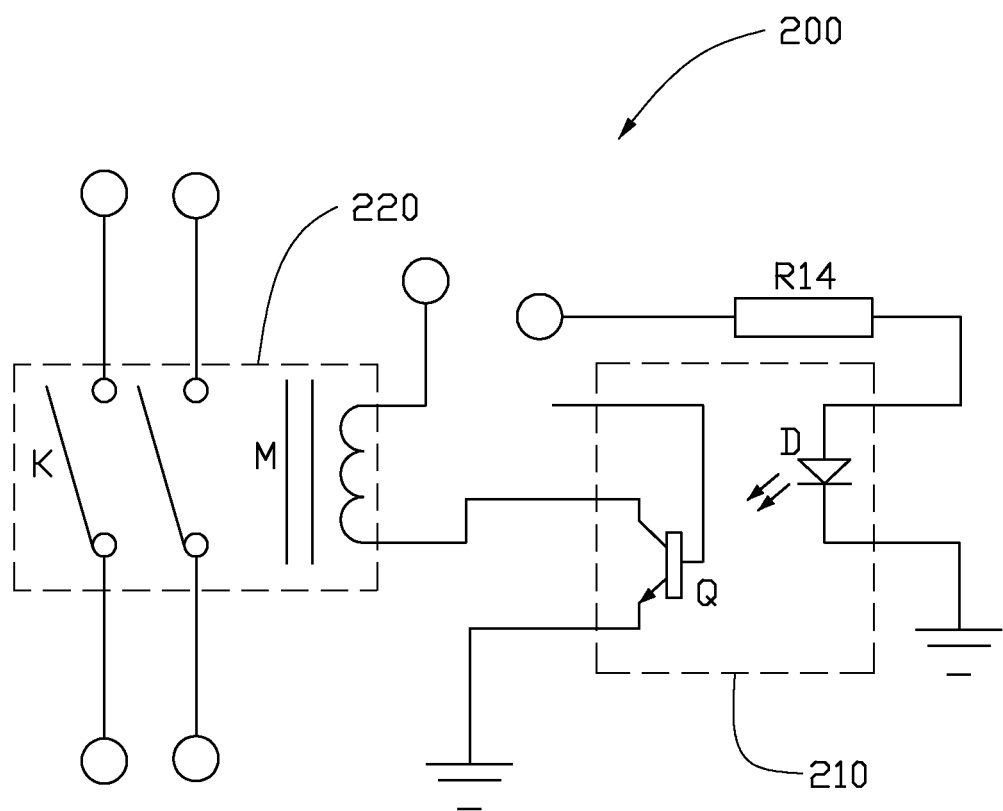
FIG. 3 is a circuit view of a switch module of FIG. 1.

Referring to FIG. 3, the switch module 200 includes a photocoupler 210 and a delay 220. The photocoupler 210 includes an LED D and a phototransistor Q. The delay 220 includes a winding element M and a switch element K. The LED D includes an LED anode and an LED cathode. The phototransistor Q includes a phototransistor base, a phototransistor emitter and a phototransistor collector. The winding element M includes a winding element first terminal and a winding element second terminal. The switch element K includes a switch element first terminal and a switch element second terminal. The LED anode is electrically connected to the control signal output terminal P1.3 for receiving the control signals. The LED cathode is grounded. The phototransistor base detects light from the LED D. The phototransistor emitter is grounded. The phototransistor Q turns on when the LED D emits light. The winding element first terminal receives a second voltage from the power supply module 400. The winding element second terminal is electrically connected to the phototransistor collector. The switch element first terminal receives a +230 volts AC voltage. The switch element second terminal outputs the first voltage to the motherboard 500 when the switch element K is closed. In one embodiment, the phototransistor Q is a NPN type transistor.

Figure 4:
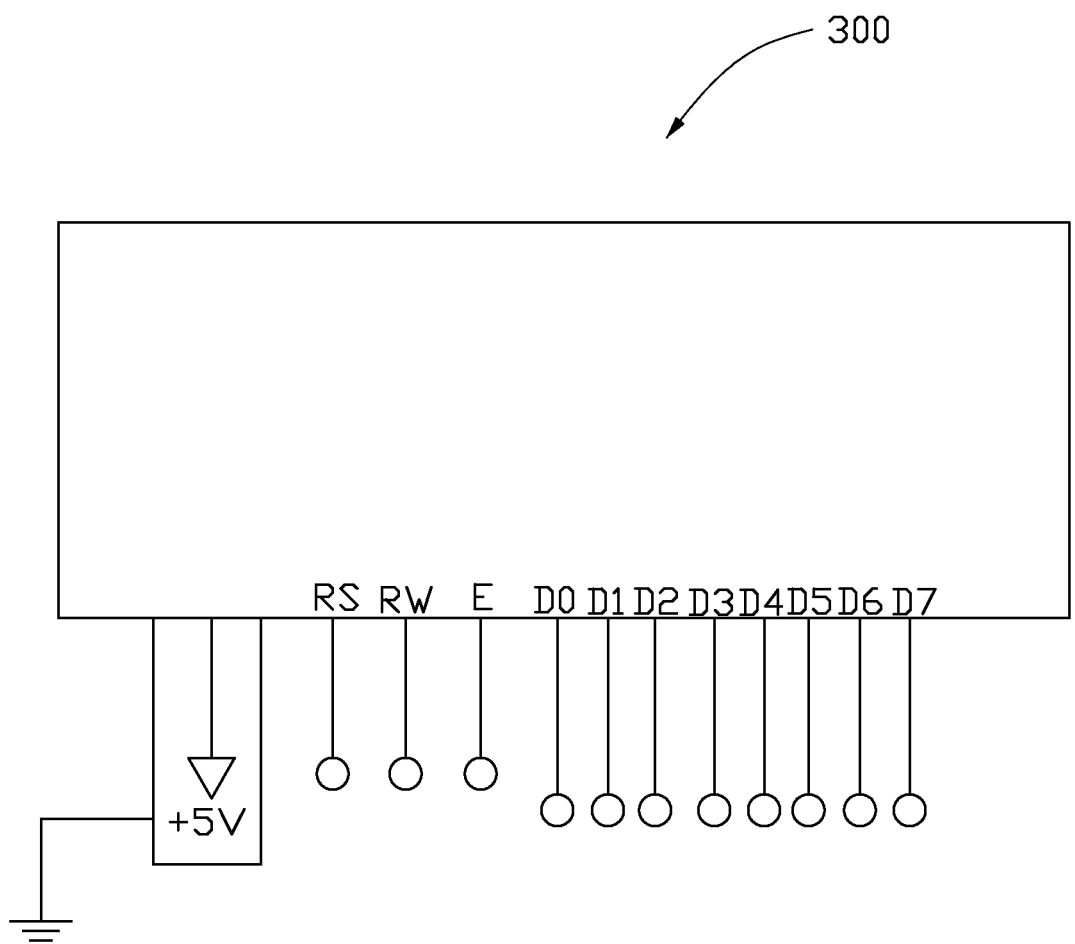
FIG. 4 is a circuit view of a display module of FIG. 1.

Referring to FIG. 4, the display module 300 includes data input terminals D0~D7, an enable input terminal E, a read and write input terminal RW and a select input terminal RS. The data input terminals D0~D7 are electrically connected to the data output terminals P3.0~P3.7 for receiving the time periods and the number of times the motherboard 500 abnormally power-on and power-off. The enable input terminal E is electrically connected to the enable output terminal P1.0. The read and write input terminal RW is electrically connected to the read and write output terminal P1.1. The select input terminal RS is electrically connected to the select output terminal P1.2. In one embodiment, the display module 300 is a LM016L type LCD produced by the HITACHI company.

Figure 5:
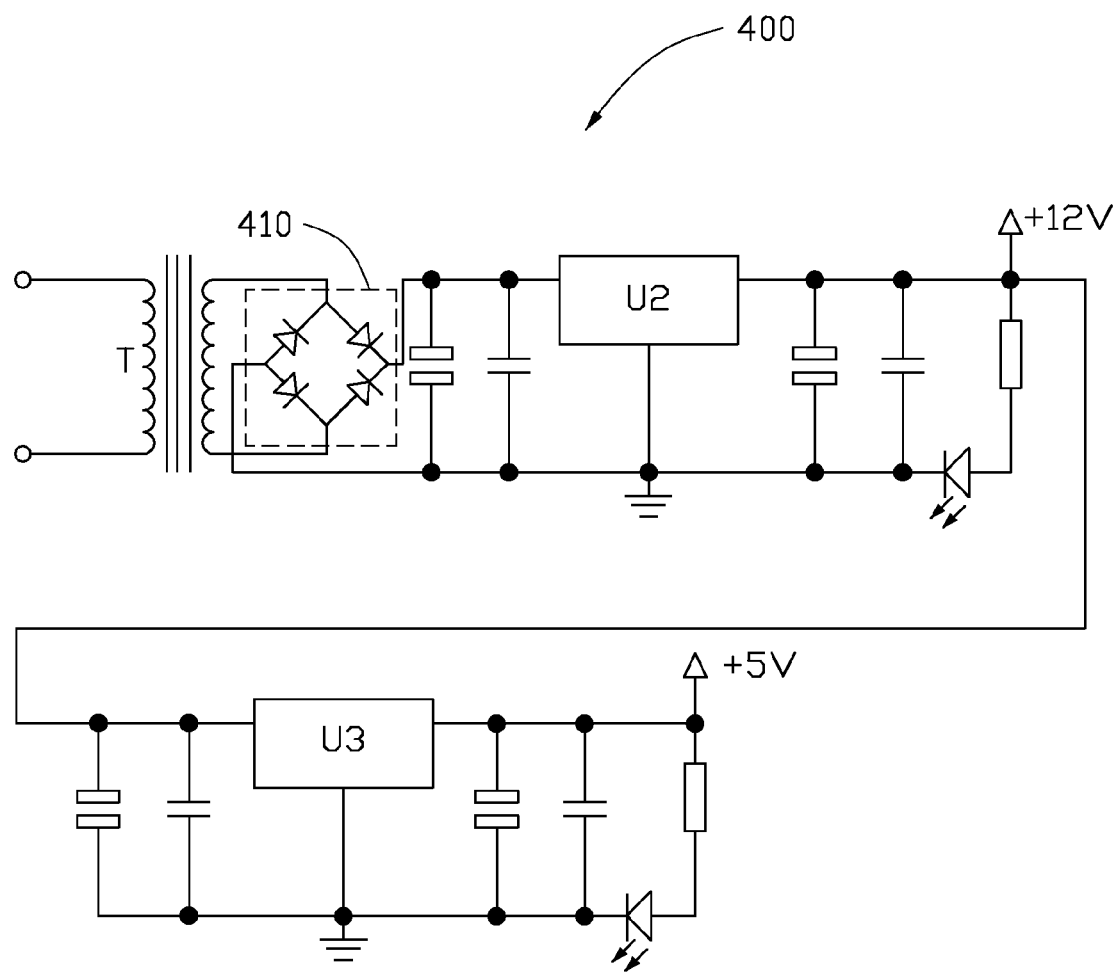
FIG. 5 is a circuit view of a power supply module of FIG. 1.

Referring to FIG. 5, the power supply module 400 includes a transformer T, a rectification circuit 410, a first voltage regulating chip U2 and a second voltage regulating chip U3. The rectification circuit 410 includes four diodes electrically connected end to end. The first voltage regulating chip U2 includes a first voltage regulating chip input terminal and a first voltage regulating chip output terminal. The second voltage regulating chip U3 includes a second voltage regulating chip input terminal and a second voltage regulating chip output terminal.

The transformer T receives the +230 volts AC voltage and outputs a decreased AC voltage. The rectification circuit 410 receives the decreased AC voltage and converts the decreased AC voltage to a DC voltage. The first voltage regulating chip U2 receives the DC voltage at the first voltage regulating chip input terminal and outputs the second voltage at the first voltage regulating chip output terminal. The second voltage regulating chip U3 receives the second voltage at the second voltage regulating chip input terminal and outputs the third voltage at the second voltage regulating chip output terminal. The third voltage is provided to the switch module 200 and the display module 300. In one embodiment, the second voltage is +12 volts; and the third voltage is +5 volts.

In use, pushing the pressing buttons K1~K3 to input the time period(s) and the number of time(s) for the motherboard 500 into the microcontroller U1. The microcontroller U1 outputs a high level signal to the photocoupler 210. The LED is powered on and emits light. The phototransistor base detects light and turns on. The winding element M is powered on and closes the switch element K. The motherboard 500 receives the first voltage and is powered on. When the time period of the motherboard 500 is equal to the predetermined period, the microcontroller U1 outputs a low level signal to the photocoupler 210. The LED is powered off and does not emit light. The phototransistor base cannot detect any light and turns off. The winding element M is powered off and opens the switch element K. The motherboard 500 ceases to receive the first voltage and is powered off. The microcontroller U1 outputs the high level signal and the low level signal to the photocoupler 210 from time to time so the motherboard 500 is powered on and powered off. The microcontroller U1 records the present number of times and the time periods during which the motherboard 500 is powered on and powered off. When the present number of times is equal to the number of times input into the microcontroller U1, the microcontroller U1 stops outputting the high level signal to the photocoupler 210 and the test is complete.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motherboard testing apparatus for testing the power-on and power-off cycle of a motherboard, comprising:
    a control module adapted to store predetermined power-on and power-off number of times and output control signals; wherein the control module is adapted to record time periods and present number of times for which the motherboard is powered on and powered off;
    a switch module adapted to provide a first voltage to the motherboard according to the control signals; and
    a display module adapted to display the time periods and the number of times the motherboard abnormally power-on and power-off,
    wherein the control module comprises a microcontroller and a plurality of pressing buttons; the microcontroller comprises a control signal output terminal, a plurality of test signal input terminals and a plurality of data output terminals; the control signal output terminal is adapted to output the control signals; the plurality of test signal input terminals are grounded via the plurality of pressing buttons; and the plurality of data output terminals are adapted to output the time periods and the number of times the motherboard abnormally powers-on and powers-off; and
    wherein the switch module comprises a photocoupler; the photocoupler comprises an LED and a phototransistor; the LED comprises an LED anode and an LED cathode; the phototransistor comprises a phototransistor base, a phototransistor emitter and a phototransistor collector; the LED anode is electrically connected to the control signal output terminal for receiving the control signals; and the phototransistor is adapted to turn on when the LED emits light.

2. The motherboard testing apparatus of claim 1, wherein the microcontroller further comprises a reset signal input terminal adapted to receive a reset signal to initialize the microcontroller.

3. The motherboard testing apparatus of claim 1, further comprising a power supply module adapted to provide power supplies to the control module, the switch module and the display module.

4. The motherboard testing apparatus of claim 3, wherein the switch module further comprises a delay; the delay comprises a winding element and a switch element; the winding element comprises a winding element first terminal and a winding element second terminal; the switch element comprises a switch element first terminal and a switch element second terminal; the winding element first terminal is adapted to receive a second voltage from the power supply module; the winding element second terminal is electrically connected to the phototransistor collector; the switch element first terminal is adapted to receive an AC voltage; and the switch element second terminal is adapted to output the first voltage when the switch element is closed.

5. The motherboard testing apparatus of claim 4, wherein the power supply module comprises a transformer, a rectification circuit, a first voltage regulating chip and a second voltage regulating chip; the first voltage regulating chip comprises a first voltage regulating chip input terminal and a first voltage regulating chip output terminal; the second voltage regulating chip comprises a second voltage regulating chip input terminal and a second voltage regulating chip output terminal.

6. The motherboard testing apparatus of claim 5, wherein the transformer is adapted to receive the AC voltage and output a decreased AC voltage; the rectification circuit is adapted to receive the decreased AC voltage and convert the decreased AC voltage to a DC voltage; the first voltage regulating chip is adapted to receive the DC voltage at the first voltage regulating chip input terminal and output the second voltage at the first voltage regulating chip output terminal; the second voltage regulating chip is adapted to receive the second voltage at the second voltage regulating chip input terminal and output the third voltage at the second voltage regulating chip output terminal.

7. The motherboard testing apparatus of claim 3, wherein the phototransistor is a NPN type transistor.

8. The motherboard testing apparatus of claim 1, wherein the display module comprises a plurality of data input terminals adapted to receive the time periods and the number of times the motherboard abnormally power-on and power-off from the data output terminals.

9. A motherboard testing apparatus for testing the power-on and power-off cycle of a motherboard, comprising:
- a control module adapted to store predetermined power-on and power-off number of times and output control signals; wherein the control module is adapted to record time periods and present number of times for which the motherboard is powered on and powered off;
- a switch module adapted to provide a first voltage to the motherboard according to the control signals; wherein the switch module comprises a photocoupler and a delay; the photocoupler comprises an LED and a phototransistor; the delay comprises a winding element and a switch element; and
- a display module adapted to display the time periods and the number of times the motherboard abnormally power-on and power-off; wherein the LED is adapted to receive the control signals; the phototransistor is adapted to turn on when the LED emits light; the winding element is adapted to be powered up and close the switch element; and the switch element is adapted to output the first voltage.

10. The motherboard testing apparatus of claim 9, wherein the control module comprises a microcontroller and a plurality of pressing buttons; the microcontroller comprises a control signal output terminal, a plurality of test signal input terminals and a plurality of data output terminals; the control signal output terminal is adapted to output the control signals; the plurality of test signal input terminals are grounded via the plurality of pressing buttons; and the plurality of data output terminals are adapted to output the time periods and the number of times the motherboard abnormally power-on and power-off.

11. The motherboard testing apparatus of claim 10, wherein the microcontroller further comprises a reset signal input terminal adapted to receive a reset signal to initialize the microcontroller.

12. The motherboard testing apparatus of claim 11, further comprising a power supply module adapted to provide power supplies to the control module, the switch module and the display module.

13. The motherboard testing apparatus of claim 12, wherein the power supply module comprises a transformer, a rectification circuit, a first voltage regulating chip and a second voltage regulating chip; the first voltage regulating chip comprises a first voltage regulating chip input terminal and a first voltage regulating chip output terminal; the second voltage regulating chip comprises a second voltage regulating chip input terminal and a second voltage regulating chip output terminal.

14. The motherboard testing apparatus of claim 10, wherein the display module comprises a plurality of data input terminals adapted to receive the time periods and the number of times the motherboard abnormally power-on and power-off from the data output terminals.

* * * * *